United States Patent
Nordlund et al.

(10) Patent No.: US 8,617,443 B2
(45) Date of Patent: Dec. 31, 2013

(54) METHOD AND EQUIPMENT FOR PROVIDING THE EDGE OF A STARTING SHEET WITH A DIELECTRIC STRIP

(75) Inventors: Lauri Nordlund, Helsinki (FI); Arto Huotari, Helsinki (FI)

(73) Assignee: Outotec Oyj, Espoo (FI)

( * ) Notice: Subject to any disclaimer, the term of this patent is extended or adjusted under 35 U.S.C. 154(b) by 164 days.

(21) Appl. No.: 13/128,693

(22) PCT Filed: Nov. 19, 2009

(86) PCT No.: PCT/FI2009/050935
§ 371 (c)(1), (2), (4) Date: May 11, 2011

(87) PCT Pub. No.: WO2010/058080
PCT Pub. Date: May 27, 2010

(65) Prior Publication Data
US 2011/0210478 A1    Sep. 1, 2011

(30) Foreign Application Priority Data
Nov. 19, 2008 (FI) ..................................... 20086092

(51) Int. Cl.
*B29C 43/18* (2006.01)
*B29C 43/34* (2006.01)
*B29C 43/36* (2006.01)
*B29C 70/76* (2006.01)

(52) U.S. Cl.
USPC ............... 264/272.15; 264/272.17; 264/275; 264/328.7; 425/127; 425/129.1; 425/121; 425/555; 425/408

(58) Field of Classification Search
None
See application file for complete search history.

(56) References Cited

U.S. PATENT DOCUMENTS

| 5,846,470 A * | 12/1998 | Funatsu et al. ................. 264/275 |
| 6,528,158 B1 | 3/2003 | Kuroda |
| 6,667,124 B2 * | 12/2003 | Suenaga et al. ................ 429/480 |
| 2005/0221060 A1 | 10/2005 | Orten et al. |
| 2007/0096363 A1 | 5/2007 | Jamia |
| 2008/0230936 A1 * | 9/2008 | Takada ........................ 264/40.1 |

FOREIGN PATENT DOCUMENTS

| CN | 101276920 A | 10/2008 |
| DE | 2937605 A1 | 3/1981 |
| DE | 3219300 A1 | 11/1983 |

(Continued)

OTHER PUBLICATIONS

International Search Report (PCT/ISA/210) issued on Feb. 16, 2010, by Finnish Patent Office as the International Searching Authority for International Application No. PCT/FI2009/050935.
International Preliminary Report on Patentability issued on Feb. 4, 2011, by Finnish Patent Office as the International Examining Authority for International Application No. PCT/FI2009/050935.

(Continued)

*Primary Examiner* — Edmund H. Lee
(74) *Attorney, Agent, or Firm* — Buchanan Ingersoll & Rooney PC

(57) ABSTRACT

A device for providing the edge of a starting sheet of an electrode used in the electrolytic refining or recovery of metals with a dielectric part comprises a die space, in which the edge of the starting sheet of the electrode can at least partly be fitted, and a feeding device of the dielectric material for feeding the dielectric material into the die space. The device comprises changing members of the volume of the die space for pressing the dielectric material in the die space to that edge of the starting sheet of the electrode, which is at least partly fitted in the die space.

21 Claims, 5 Drawing Sheets

(56) References Cited

FOREIGN PATENT DOCUMENTS

| | | | |
|---|---|---|---|
| DE | 3707481 | A1 | 9/1988 |
| JP | 6-71723 | A | 3/1994 |
| WO | WO 2005/026413 | A1 | 3/2005 |
| WO | WO 2005/057682 | A2 | 6/2005 |

OTHER PUBLICATIONS

Notification of First Office Action issued in corresponding Chinese Application No. 200980145815.6, mailed Jun. 5, 2013.
Spanish Search Report issued in corresponding Spanish Application No. 201150008, mailed Oct. 24, 2013.

* cited by examiner

METHOD AND EQUIPMENT FOR PROVIDING THE EDGE OF A STARTING SHEET WITH A DIELECTRIC STRIP

BACKGROUND OF THE INVENTION

The invention relates to a method according to the preamble of claim 1 for providing the edge of the starting sheet of an electrode used in the electrolytic refining or recovery of metals with a dielectric strip.

The invention relates to equipment according to the preamble of claim 16 for providing the edge of the starting sheet of an electrode used in the electrolytic refining or recovery of metals with a dielectric strip.

In the electrolytic refining and recovery process, which is used as a sub-process in the manufacture of metals, such as copper, nickel and zinc, a starting sheet made of, for example, stainless steel, aluminium or titanium is used as the electrode, and the metal to be refined is precipitated on the different sides of the sheet by means of an electric current. The metal that is accumulated on the surface is detached from the starting sheet at regular intervals. Generally, the electrolytic refining and recovery process is carried out in electrolytic tanks, which contain a sulphuric acid-bearing electrolyte and, alternatively immersed therein, plate-like electrodes, i.e., anodes and cathodes, which are made of an electrically conductive material. At the upper edges of the anodes and cathodes, there are lugs or rods, by which they hang at the edges of the electrolytic tank, and through which they are connected to an electric circuit and by means of which they are lifted into and out of the tank. The metal to be produced is either delivered to the electrolytic process in soluble, so-called active anodes, or in a form that has already dissolved in the electrolyte at a preceding process stage, whereby insoluble, so-called passive anodes are used.

Due to the electric current, the metal to be produced in the electrolytic refining and recovery process accumulates on all the conductive surfaces of the starting sheet, i.e., if the entire starting sheet is conductive, the metal to be produced covers, as a uniform layer, the entire part of the starting sheet that is lowered into the electrolyte. In that case, the deposits of the produced metal that are accumulated on the two sides of the starting sheet are, at three sides thereof, attached to each other over the narrow edges of the starting sheet and, therefore, the deposits of the produced metal are very difficult to separate from the starting sheet. To easily detach the deposits of the produced metal from the surfaces of the starting sheet, the deposition of the produced metal over the narrow edges of the starting sheet must be prevented, i.e., the edges of the starting sheet must be rendered non-conductive. The most common way of rendering the edges of the starting sheet non-conductive is to cover the edges of the starting sheet with parts, such as edge strips that are made of a dielectric material, such as plastic.

The publication WO/2005/057682 discloses a method of providing the edge portion of a sheet, such as the starting sheet of an electrode with a strip, such as a strip consisting of plastic material, by using equipment that comprises a die space. In this known method, the portion of the sheet edge is fitted inside the equipment that feeds the plastic material into the die space, the restrictive members and the die surfaces of the equipment preventing the escape of the heated plastic material out of the die space; the sheet and the equipment that feeds the plastic material are arranged so as to be movable with respect to each other, the portion of the sheet edge being located in the said equipment, and the die space of the equipment is heated during the process.

A problem with the solution disclosed in the specification WO/2005/057682 is the poor adhesion of the plastic strip to the edge portion of the plate-like component as a result of the shrinkage of the plastic material.

JP06071723 discloses an arrangement for providing a panel, such as the window of a vehicle, with a frame.

DE 29 37 605 discloses a device for casting or extrusion moulding the edges of a laminar part.

US 2005/0221060 discloses a process and an apparatus for providing a component with a profile edge.

DE 37 07 481 discloses a mat manufactured from fibrous material, having an edge portion.

DE 32 19 300 discloses a cathode for the galvanic separation of metals, especially zinc.

SHORT DESCRIPTION OF THE INVENTION

The object of the invention is to solve the problem mentioned above.

The object of the invention is achieved by the method according to the independent claim for providing the edge of the starting sheet of an electrode used in the electrolytic refining or recovery of metals with a dielectric strip.

The preferred embodiments of the method according to the invention are presented in the dependent claims.

The invention also relates to the equipment according to the independent claim 16 for providing the edge of the starting sheet of an electrode used in the electrolytic refining or recovery of metals with a dielectric strip.

The preferred embodiments of the equipment according to the invention are presented in the dependent claims.

The invention is based on the fact that the molten dielectric material that constitutes the dielectric strip is pressed, in the die space, to the edge of the starting sheet of the electrode that is at least partly fitted in the die space, while the molten dielectric material in the die space solidifies to form the dielectric strip, adhering to the edge of the starting sheet of the electrode.

An advantage, which is achieved by the solution according to the invention, is that no gap is formed between the dielectric strip and the edge of the starting sheet of the electrode when the molten dielectric material shrinks, while the molten dielectric material solidifies in the die space to form the dielectric strip, adhering to the edge of the starting sheet of the electrode. For this reason, the strip remains firmly attached to the edge of the starting sheet of the electrode. This is of advantage particularly in the electrolytic refining or recovery process of metals. If there is no gap between the strip and the edge of the electrode's starting sheet, no electrolytic liquid is allowed between the strip and the edge of the electrode's starting sheet to weaken the seam between the edge of the electrode's starting sheet and the strip.

The solution according to the invention also provides the advantage that if that edge of the starting sheet of the electrode, which is at least in part fitted in the die space, is provided with openings that extend through the edge of the starting sheet of the electrode, pressing of the dielectric material also results in a better penetration of the dielectric material into the said through-openings of the edge of the starting sheet of the electrode to provide connections between the dielectric material on the opposite sides of the edge of the starting sheet of the electrode.

The solution according to the invention also provides the advantage that, as the dielectric material is pressed to the edge of the starting sheet of the electrode during the solidification, a condition of bearing stress remains in the dielectric strip, tending to keep the dielectric strip attached to the edge of the starting sheet of the electrode.

In a preferred embodiment of the method according to the invention, equipment is used, wherein the die space consists of several die parts, at least one of which is movable with respect to the die space and forms a pusher for changing the volume of the die space. In this preferred embodiment, the molten dielectric material in the die space is pressed to the edge of the starting sheet of the electrode, which is at least partly located in the die space, during the solidification stage by using the movable die part(s), which is/are moved with respect to the die space so that the volume of the die space decreases during the solidification stage, due to which the dielectric material in the die space is pressed to the edge of the starting sheet of the electrode and remains attached thereto during the shrinkage of the material.

In a preferred embodiment of the method according to the invention, the molten dielectric material in the die space is pressed to the edge of the starting sheet of the electrode, which is at least partly in the die space, by a pusher that moves into the die space during the solidification stage. As the pusher moves into the die space, which contains molten dielectric material, the volume available to the molten dielectric material in the die space decreases and the pressure in the die space increases, resulting in the molten dielectric material being pressed against the edge of the starting sheet of the electrode. It is for instance conceivable that the die space consists of die parts which are immovable in relation to each other and which form a die space into which the pusher can be moved.

In a preferred embodiment of the method according to the invention, the edge of the starting sheet of the electrode is essentially fully fitted in the die space at the positioning stage for providing the edge of the starting sheet of the electrode with a dielectric strip. Compared with the solution disclosed in the patent specification WO/2005/057682, wherein the edge of the starting sheet of the electrode and the die move with respect to each other, this provides the advantage that the edge of the starting sheet of the electrode and the die need not to be moved with respect to each other, resulting in the quality of the dielectric strip that is formed at the edge of the starting sheet of the electrode being completely uniform. This embodiment also provides the advantage that, as the edge of the starting sheet of the electrode is essentially fully located in the die space, the thermal stress during the manufacture of the dielectric strip is uniform essentially throughout the edge of the starting sheet of the electrode. This reduces the possible deformation of the starting sheet of the electrode, which is often a result of an uneven heat stress, which is the case in the patent specification WO/2005/057682, for example. It is possible, for example, that the dielectric strip is partly or fully detached as a result of the deformation of the starting sheet of the electrode.

LIST OF FIGURES

In the following, some preferred embodiments of the invention are described in detail with reference to the appended figures, wherein.

DETAILED DESCRIPTION OF THE INVENTION

Figure 1:
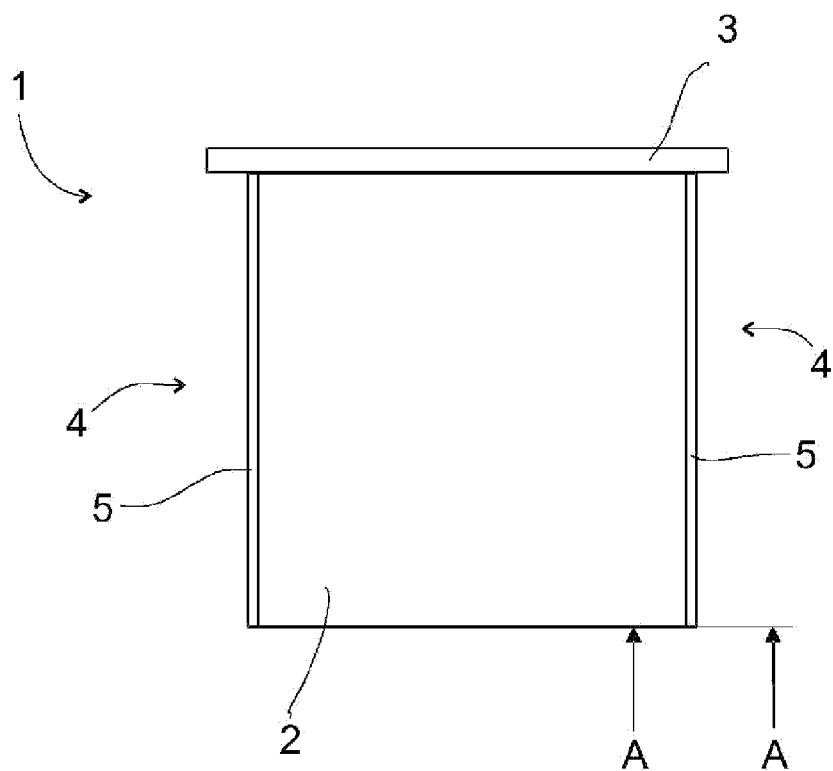
FIG. 1 shows the electrode.
Figure 2:
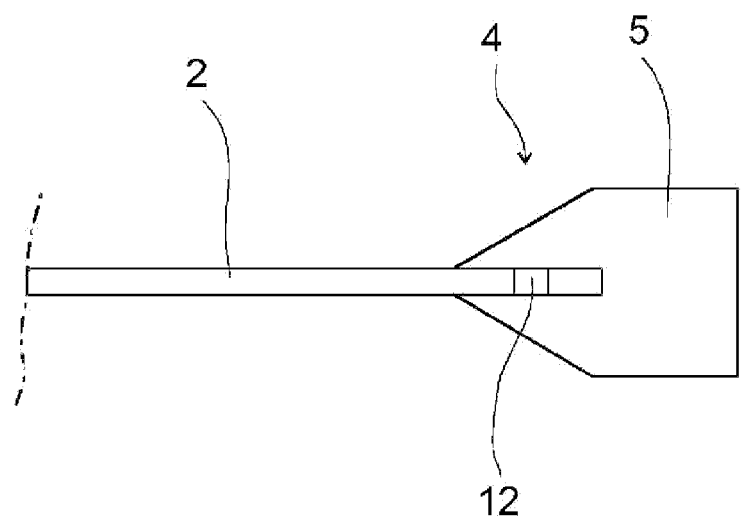
FIG. 2 is an enlargement at A-A of FIG. 1.

FIG. 1 shows the electrode 1, which can be used in the electrolytic refining or recovery of metals. The electrode 1 in FIG. 1 comprises a starting sheet 2, and a supporting member 3 of the starting sheet 2 for supporting the starting sheet 2 in an electrolytic tank (not shown). Two edges 4 of the starting sheet 2 of the electrode 1 shown in FIG. 1 are provided with strips 5, which consist of dielectric material.

The object of the invention firstly comprises a method of providing the edge 4 of the starting sheet 2 of the electrode with a dielectric strip 5 that consists of dielectric material 14.

The method employs equipment 6 that comprises a die space 7 and a feeding device 8 of the dielectric material for feeding the dielectric material 14 into the die space 7.

The dielectric material 14 can be, for example, a polymeric material, such as plastic.

The method comprises a positioning stage, at which the edge 4 of the starting sheet 2 of the electrode is at least partly fitted in the die space 7.

The method further comprises a feeding stage, at which the dielectric material 14 is fed into the die space 7.

In the method, the positioning stage can be carried out before the feeding stage, but it is also possible to carry out the feeding stage before the positioning stage. In other words, it is possible to first fit the edge 4 of the starting sheet 2 of the electrode at least partly in the die space 7 and to thereafter feed the dielectric material 14 into the die space 7, but it is also possible to first feed the dielectric material 14 into the die space 7 and to thereafter fit the edge 4 of the starting sheet 2 of the electrode at least partly in the die space 7.

The method further comprises a melting stage, at which the dielectric material 14 that constitutes the dielectric strip 5 is melted.

The method further comprises a solidification stage, at which the molten dielectric material 14 that constitutes the dielectric strip 5 is allowed to solidify in the die space 7 for providing that edge 4 of the starting sheet 2 of the electrode, which is at least partly fitted in the die space 7, with a strip 5 that consists of plastic material.

In the method, the dielectric material 14 in the die space 7, constituting the dielectric strip 5, is preferably but not necessarily pressed to the edge 4 of the starting sheet 2 of the electrode, which at least partly lies in the die space 7, during the solidification stage. In the method, the dielectric material 14 in the die space 7, constituting the dielectric strip 5, is preferably but not necessarily pressed to the edge 4 of the starting sheet 2 of the electrode, which at least partly lies in the die space 7, by changing the volume of the die space 7 during the solidification stage.

In the method, the melting stage can be carried out before the feeding stage, so that the dielectric material 14 in molten form is fed into the die space 7. In that case, an extruder (not shown) is preferably, but not necessarily, used at the feeding stage for feeding the dielectric material 14 in molten form into the die space 7.

Alternatively, the feeding stage can be carried out before the melting stage, so that the dielectric material 14 in solid form, e.g., as a granulate, bar, strip, powder or wire, is fed into the die space 7, after which the melting stage is carried out in the die space 7 by melting the dielectric material 14 in the form of granulate in the die space 7.

The method preferably, but not necessarily, employs equipment 6, where the die space 7 consists of several die parts 9 and 10. In that case, the edge 4 of the starting sheet 2 of the electrode is at least partly fitted in the die space 7 by arranging the die parts 9 and 10 at least partly around the edge 4 of the starting sheet 2 of the electrode, so that the edge 4 of the starting sheet 2 of the electrode is at least partly located in the die space 7 formed by the die parts. For example, it is possible to provide a gap (not shown) between the die parts, through which the edge 4 of the starting sheet 2 of the electrode can be fitted in the die space 7 by moving the edge 4 of the starting sheet 2 of the electrode and the die parts 9 with respect to each other.

Preferably, but not necessarily, the method employs equipment 6, in which the die space 7 is formed by several die parts 9 and 10, which are immovable in relation to each other and which form the die space 7.

The method preferably, but not necessarily, employs equipment 6, wherein the die space 7 consists of several die parts 9, at least one die part 9 and 10 being a movable die part 10, as shown in FIGS. 3-10. In that case, the edge 4 of the starting sheet 2 of the electrode is at least partly fitted in the die space 7 by arranging or moving the die parts 9 and 10 at least partly around the edge 4 of the starting sheet 2 of the electrode, so that the edge 4 of the starting Sheet 2 of the electrode is at least partly located in the die space 7 formed by the die parts.

If the method employs the equipment 6, wherein the die space 7 consists of several die parts 9 and 10, at least one of which is the movable die part 10, the said at least one movable die part 10 is preferably, but not necessarily, used as the changing member 13 of the volume of the die space 7, which is moved with respect to the die space 7, so that the volume of the die space 7 is reduced during the solidification stage, as a result of which the molten dielectric material in the die space 7 is pressed against the edge 4 of the starting sheet 2 of the electrode that is at least partly fitted in the die space 7, and it is kept pressed against that edge 4 of the starting sheet 2 of the electrode, which is at least partly fitted in the die space 7, during the solidification stage of the molten dielectric material. FIGS. 7-10 show a solution in which one of the movable die parts 10 forms a volume changing member 13 in the form of a pusher 11, this pusher 11 being moved in relation to the die space 7.

The method preferably, but not necessarily, employs equipment 6, wherein the die space 7 consists of several die parts 9 and 10, at least one die part 9 and 10 being an inclinable die part (not shown). In that case, the edge 4 of the starting sheet 2 of the electrode is at least partly fitted in the die space 7 by arranging or inclining the die parts 9 at least partly around the edge 4 of the starting sheet 2 of the electrode, so that the edge 4 of the starting sheet 2 of the electrode is at least partly located in the die space 7 formed by the die parts. If the method employs the equipment 6, wherein the die space 7 consists of several die parts 9 and 10, at least one of which is the inclinable die part, the said at least one inclinable die part is preferably, but not necessarily, used as the changing member 13 of the volume of the die space 7, which is inclined with respect to the die space 7 (during) the solidification stage, so that the volume of the die space 7 is reduced during the solidification stage, as a result of which the molten dielectric material in the die space 7 is pressed against the edge 4 of the starting sheet 2 of the electrode that is at least partly fitted in the die space 7.

The method preferably, but not necessarily, employs the equipment 6, wherein the die space 7 consists of several die parts 9 and 10, at least one die part 9 and 10 being a movable and inclinable die part (not shown). In that case, the edge 4 of the starting sheet 2 of the electrode is at least partly fitted in the die space 7 by arranging or moving and inclining the die parts 9 at least partly around the edge 4 of the starting sheet 2 of the electrode, so that the edge 4 of the starting sheet 2 of the electrode is at least partly located in the die space 7 formed by the die parts. If the method employs the equipment 6, wherein the die space 7 consists of several die parts 9 and 10, at least one of which is the movable and inclinable die part, the said at least one movable and inclinable die part is preferably, but not necessarily, used as the changing member 13 of the volume of the die space 7, which is inclined with respect to the die space 7 (during) the solidification stage, so that the volume of the die space 7 is reduced during the solidification stage, as a result of which the molten dielectric material in the die space 7 is pressed against the edge 4 of the starting sheet 2 of the electrode that is at least partly fitted in the die space 7.

Figure 3:
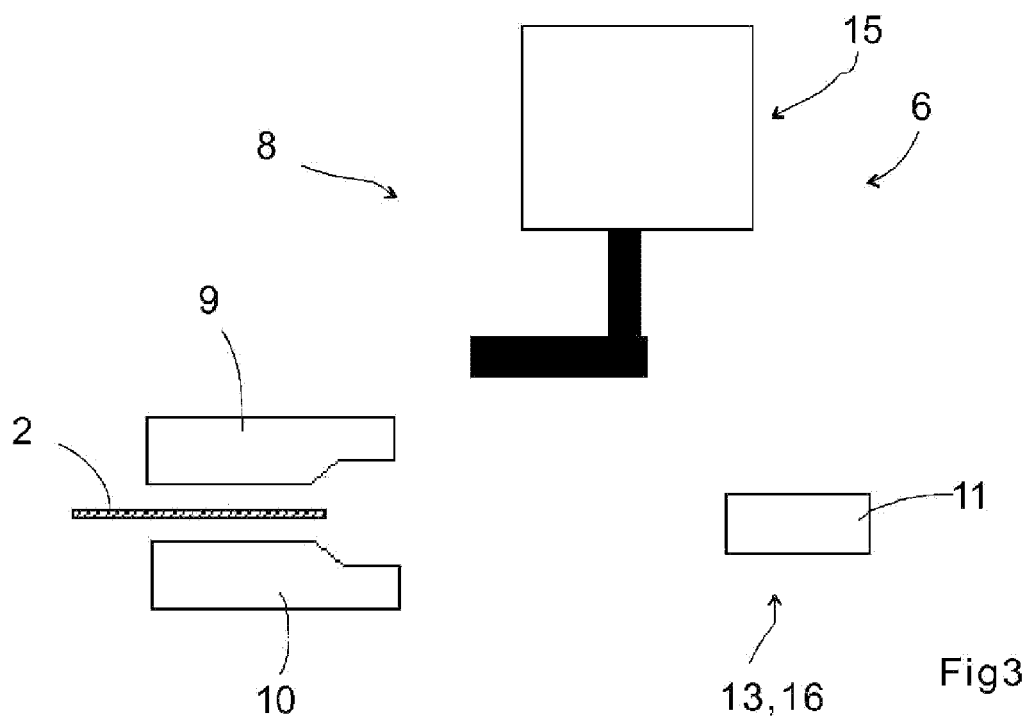
FIGS. 3-6 show the operating principle of a first embodiment of the equipment according to the invention.

One preferred embodiment of the method according to the invention employs, as the changing member 13 of the volume of the die space 7, a pusher 11, which at least partly moves inside the die space 7 and which is at least partly moved into the die space 7 or inside the die space 7 during the solidification stage, to reduce the volume of the die space 7 during the solidification stage, as a result of which the molten dielectric material in the die space 7 is pressed against that edge 4 of the starting sheet 2 of the electrode, which that is at least partly fitted in the die space 7. FIGS. 3 6 show such a solution. It is for instance conceivable that the die space consists, in contrast to FIG. 3-6, of several die parts 9 and 10, which are immovable relation to each other and which form a die space 7 into which the pusher 11 can be moved.

In the method according to the invention, equipment 6 can also be used, wherein the die space 7 consists of several die parts, at least one of which is at least partly manufactured of a flexible material, such as rubber. The said at least one die part that is at least partly manufactured of the flexible material is used as the changing member 13 of the volume of the die space 7 to change the volume of the die space 7 by moving the said at least one die part that is at least partly manufactured of the flexible material at least partly into the die space 7 or inside the die space 7 during the solidification stage. The said at least one die part that is at least partly manufactured of the flexible material can be, for example, mechanically moved with respect to the die space 7 or by means of a medium, such as gas or liquid. If the said at least one die part that is at least partly manufactured of the flexible material is moved by means of the medium with respect to the die space 7, it is possible, for example, that the said at least one die part that is at least partly manufactured of the flexible material comprises a cavity (not shown), in which the medium can be introduced, so that the cavity expands, resulting in the said die part that is at least partly manufactured of the flexible material partly moving into the die space 7, reducing the volume of the die space 7 and pressing the molten dielectric material 14 in the die space against that edge 4 of the starting sheet 2 of the electrode, which is at least partly fitted in the die space 7, during the solidification stage.

One preferred embodiment of the method according to the invention employs, as the changing member 13 of the volume of the die space 7, a medium, such as gas or liquid, which is fed into the die space 7 during the solidification stage, resulting in the molten dielectric material in the die space 7 being pressed against that edge 4 of the starting sheet 2 of the electrode, which is at least partly fitted in the die space 7, resulting in the molten dielectric material in the die space 7 being pressed against that edge 4 of the starting sheet 2 of the electrode, which is at least partly fitted in the die space 7.

In the method according to the invention, equipment 6 can also be used, wherein the die space 7 consists of several die parts, at least one of which is at least partly manufactured of a memory metal. The said at least one die part that is at least partly made of the memory metal is used as the changing member 13 of the volume of the die space 7 for changing the volume of the die space 7 by moving the said at least one die part that is at least partly made of the memory metal at least partly into the die space 7, i.e., inside the die space 7 during the solidification stage by expanding the said at least one die part that is at least partly made of the memory metal by means of an electric current and/or magnetic field, so that the die space 7 decreases and the dielectric material 14 in the die space 7 is pressed into the die space 7 against that edge 4 of the starting sheet 2 of the electrode, which is at least partly fitted in the die space 7, during the solidification stage.

In a preferred embodiment of the method according to the invention, the dielectric material 14 is fed into the die space 7 by a feeding device 8 of the dielectric material that moves with respect to the die space 7.

In a preferred embodiment of the method according to the invention, the edge 4 of the starting sheet 2 of the electrode is provided with grip members 12 for improving the adhesion of the strip 5.

In a preferred embodiment of the method according to the invention, the edge 4 of the starting sheet 2 of the electrode is provided with grip members 12 in the form of openings that go through the edge 4 of the starting sheet 2 of the electrode, in order to improve the adhesion of the strip 5.

In a preferred embodiment of the method according to the invention, the edge of the starting sheet 2 of the electrode is kept in place with respect to the die space 7 during the feeding and pressing stages.

In a preferred embodiment of the method according to the invention, the die space 7 is cooled during the solidification stage to accelerate the solidification of the molten dielectric material 14.

The object of the invention also comprises equipment 6 for providing the edge 4 of the starting sheet 2 of an electrode used in the electrolytic refining or recovery of metals with a dielectric strip 5 that consists of dielectric material 14.

The equipment 6 comprises a die space 7, which the edge 4 of the starting sheet 2 of the electrode can at least partly be fitted in.

The equipment 6 also comprises melting equipment 15 for melting the dielectric material 14.

Furthermore, the equipment 6 comprises a feeding device 8 of the dielectric material for feeding the dielectric material 14 into the die space 7.

The equipment 6 also comprises pressing members 16 for pressing the dielectric material in the die space 7 to that edge 4 of the starting sheet 2 of the electrode, which is at least partly fitted in the die space 7, during the solidification stage of the dielectric material 14 that is melted by the melting equipment 15.

The pressing members 16 preferably, but not necessarily, comprise the changing members 13 of the volume of the die space 7 for changing the volume of the die space 7 for pressing the dielectric material in the die space 7 to that edge 4 of the starting sheet 2 of the electrode, which is at least partly fitted in the die space 7, during the solidification stage of the dielectric material 14 that is melted by the melting equipment 15.

The melting equipment 15 can be fitted in the feeding device 8 of the dielectric material, so that the feeding device 8 of the dielectric material is adapted to feed the dielectric material in molten form into the die space 7. In that case, the feeding device 8 of the dielectric material preferably, but not necessarily, comprises an extruder for feeding the dielectric material in molten form into the die space 7.

The feeding device 8 of the dielectric material can be adapted to feed the dielectric material in solid form into the die space 7, e.g., as a granulate, bar, strip, powder or wire into the die space 7. In that case, the melting equipment 15 is fitted in the die space 7, so that the melting equipment 15 is adapted to melt, in the die space 7, the dielectric material that has been fed into the die space 7 in solid form, e.g., as a granulate, bar, strip, powder or wire.

The die space 7 preferably, but not necessarily, consists of several die parts 9 and 10. In that case, the edge 4 of the starting sheet 2 of the electrode can at least partly be fitted in the die space 7 by arranging the die parts 9 and 10 at least partly around the edge 4 of the starting sheet 2 of the electrode, so that the edge 4 of the starting sheet 2 of the electrode is at least partly located in the die space 7 formed by the die parts 9 and 10.

The die space 7 preferably, but not necessarily, consists of several die parts 9 and 10, at least one of them being a movable die part 10. In that case, the edge 4 of the starting sheet 2 of the electrode can at least partly be fitted in the die space 7 by arranging the die parts 9 and 10 at least partly around the edge 4 of the starting sheet 2 of the electrode, so that the edge 4 of the starting sheet 2 of the electrode is at least partly located in the die space 7 formed by the die parts 9 and 10.

It is also conceivable that the die space consists, in contrast to FIGS. 3-10, of several die parts 9 and 10, which are immovable in relation to each other and which form the die space 7.

The die space 7 preferably, but not necessarily, consists of several die parts 9 and 10, at least one of them being the movable die part 10, which also constitutes the changing member 13 which changes the volume of the die space 7 and which is in the form of a pusher 11 that can be moved with respect to the die space 7 when the edge 4 of the starting sheet 2 of the electrode is at least partly located in the die part 9 and the dielectric material 14 has been fed into the die space 7, so that the volume of the die space 7 decreases during the solidification stage of the dielectric material 14 that is melted by the melting equipment 15, resulting in the molten dielectric material in the die space 7 being pressed against that edge 4 of the starting sheet 2 of the electrode, which is at least partly fitted in the die space 7.

The die space 7 preferably, but not necessarily, consists of several die parts 9 and 10, at least one die part being an inclinable die part (not shown). In that case, the edge 4 of the starting sheet 2 of the electrode can at least partly be fitted in the die space 7 by arranging the die parts 9 at least partly around the edge 4 of the starting sheet 2 of the electrode, so that the edge 4 of the starting sheet 2 of the electrode is at least partly located in the die space 7 formed by the die parts. If the die space 7 consists of several die parts 9 and 10, at least one of which is the inclinable die part, the inclinable die part preferably, but not necessarily, also constitutes the changing member 13 of the volume of the die space 7, which can be inclined with respect to the die space 7, when the edge 4 of the starting sheet 2 of the electrode is at least partly located in the die part 9 and the dielectric material 14 has been fed into the die space 7, so that the volume of the die space 7 decreases during the solidification stage of the dielectric material 14 that has been melted by the melting equipment 15, resulting in the molten dielectric material in the die space 7 being pressed against that edge 4 of the starting sheet 2 of the electrode, which is at least partly fitted in the die space 7.

The die space 7 preferably, but not necessarily, consists of several die parts 9 and 10, at least one die part being a movable and inclinable die part (not shown). In that case, the edge 4 of the starting sheet 2 of the electrode can at least partly be fitted in the die space 7 by arranging the die parts at least partly around the edge 4 of the starting sheet 2 of the electrode, so that the edge 4 of the starting sheet 2 of the electrode is at least partly located in the die space 7 formed by the die parts. If the die space 7 consists of several die parts 9, at least one of which is the movable and inclinable die part, the movable and inclinable die part preferably, but not necessarily, also constitutes the changing member 13 of the volume of the die space 7, which can be moved and inclined with respect to the die space 7, when the edge 4 of the starting sheet 2 of the electrode is at least partly located in the die part 9 and the dielectric material 14 has been fed into the die space 7, so that the volume of the die space 7 decreases during the solidification stage of the dielectric material 14 that has been melted by the melting equipment 15, resulting in the molten dielectric material in the die space 7 being pressed against that edge 4 of the starting sheet 2 of the electrode, which is at least partly fitted in the die space 7.

In a preferred embodiment of the equipment according to the invention, the changing member 13 of the volume of the die space 7 is a pusher 11, which can be moved at least partly into the die space 7, when the edge 4 of the starting sheet 2 of the electrode is at least partly located in the die space 7 and the dielectric material 14 has been fed into the die space 7, so that the volume of the die space 7 decreases during the solidification stage of the dielectric material 14 that is melted by the melting equipment 15, resulting in the molten dielectric material in the die space 7 being pressed against that edge 4 of the starting sheet 2 of the electrode, which is at least partly fitted in the die space 7. It is also conceivable that the die space 7 consists, in contrast to FIGS. 3-6, of several die parts which are immovable in relation to each other and which form the die space into which the pusher 11 can be moved.

In the equipment 6 according to the invention, the die space 7 may consist of several die parts, so that at least one die part is at least partly manufactured of a flexible material, such as rubber. In that case, the at least one die part that is at least partly made of the flexible material may constitute the changing member 13 of the volume of the die space 7 for changing the volume of the die space 7, the changing member being at least partly movable into the die space 7 or inside the die space 7 during the solidification stage. The said at least one die part that is at least partly made of the flexible material can be one that can be moved, e.g., mechanically or by means of a medium, such as gas or liquid, with respect to the die space 7. If the said at least one die part that is at least partly manufactured of the flexible material is movable by means of the medium with respect to the die space 7, it is possible that the said at least one die part that is at least partly manufactured of the flexible material comprises a cavity (not shown), into which the medium can be introduced, so that the cavity expands, resulting in the said die part that is at least partly manufactured of the flexible material partly moving into the die space 7, reducing the volume of the die space 7 and pressing the molten dielectric material 14 in the die space against that edge 4 of the starting sheet 2 of the electrode, which is at least partly fitted in the die space 7, during the solidification stage.

In a preferred embodiment of the method according to the invention, the changing member 13 of the volume of the die space 7 is a medium, such as gas or liquid, which can be fed into the die space 7 during the solidification stage for reducing the volume of the die space 7 and for pressing the molten dielectric material 14 in the die space against that edge 4 of the starting sheet 2 of the electrode, which is at least partly fitted in the die space, during the solidification stage.

The equipment 6 according to the invention can also be one, wherein the die space 7 consists of several die parts, at least one of which is at least partly manufactured of a memory metal. The said at least one die part that is at least partly made of the memory metal then constitutes the changing member 13 of the volume of the die space 7 for changing the volume of the die space 7, which member can at least partly be moved into the die space 7 or inside the die space 7 during the solidification stage, by expanding the said at least one die part that is at least partly made of the memory metal by means of an electric current and/or a magnetic field, so that the die space 7 decreases and the dielectric material 14 in the die space 7 is pressed to the die space 7 against that edge 4 of the starting sheet 2 of the electrode, which is at least partly fitted in the die space 7, during the solidification stage.

In a preferred embodiment of the equipment according to the invention, the equipment 6 that feeds the dielectric material is adapted to move with respect to the die space 7.

In a preferred embodiment of the equipment according to the invention, the edge 4 of the starting sheet 2 of the electrode can be fully fitted in the die space 7.

In a preferred embodiment of the equipment according to the invention, the equipment 6 comprises a cooling arrangement for cooling the die space 7 to accelerate the solidification of the molten dielectric material 14.

FIGS. 3-6 show the operation of a first embodiment of the equipment according to the invention.

In FIG. 3, the edge 4 of the starting sheet 2 of the electrode is placed between two fixed 9 and moving die parts 10.

Figure 4:
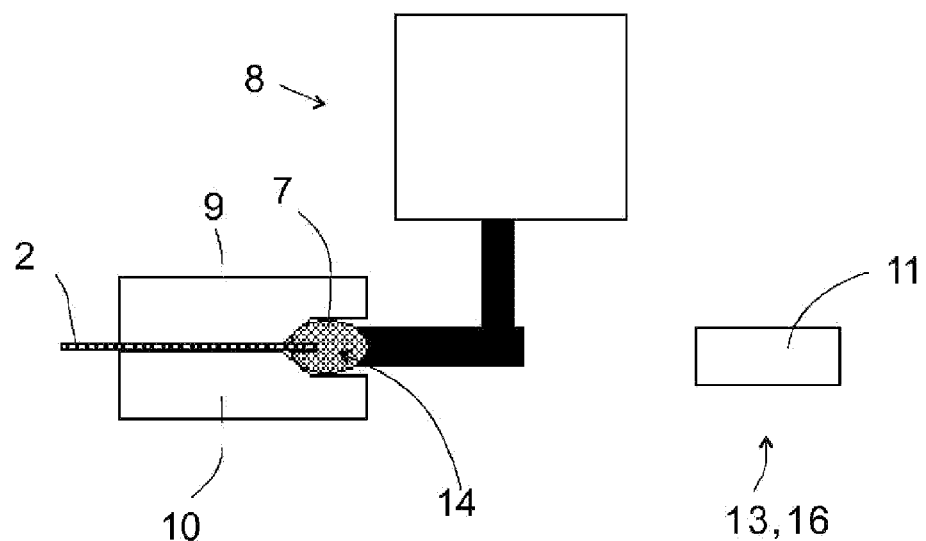

FIG. 4 shows a position after FIG. 3, wherein the die parts 9 and 10 are arranged with respect to the edge 4 of the starting sheet 2 of the electrode, so that a die space 7 is formed, wherein the edge 4 the starting sheet 2 of the electrode lies. In FIG. 4, the dielectric material 14; in this case, molten plastic material, is fed into the die space 7.

Figure 5:
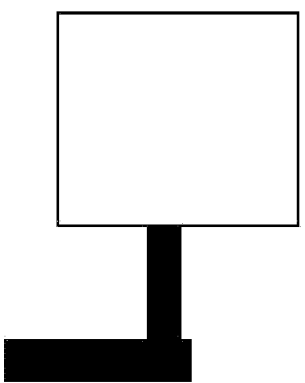
Figure 5:
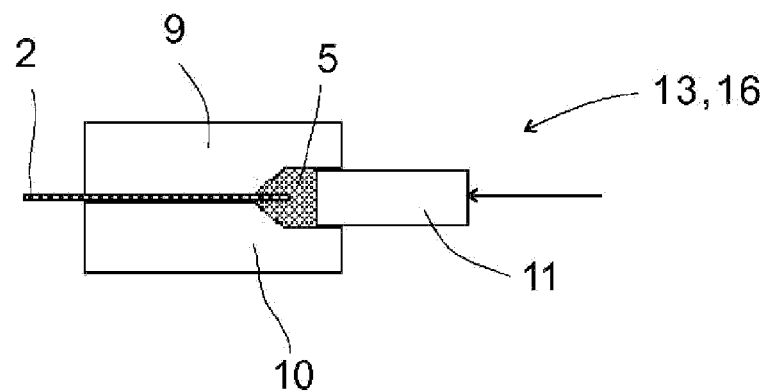
Figure 6:
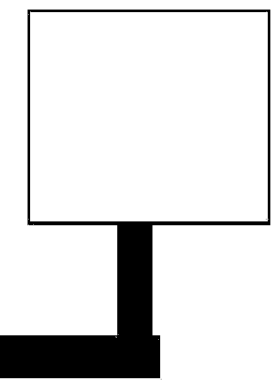
Figure 6:
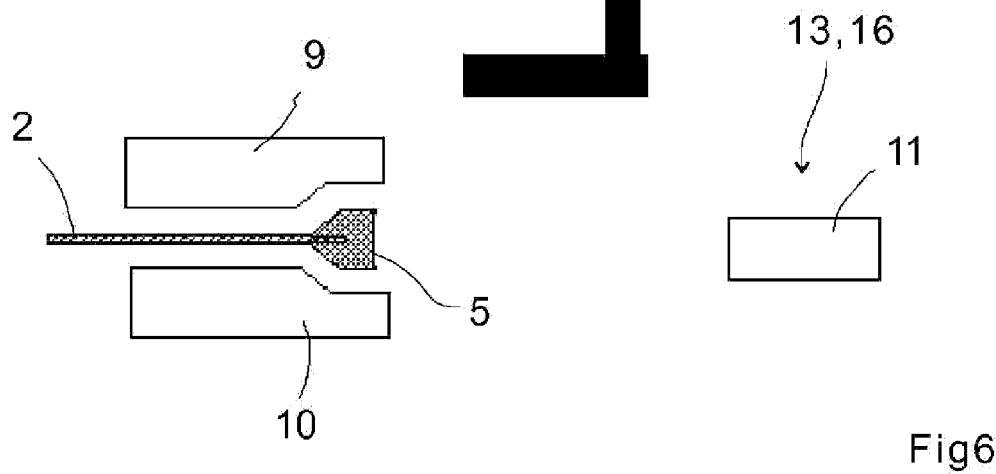

FIG. 5 shows a position after FIG. 4, wherein the changing member 13 of the volume of the die space 7 that is in the form of a pusher 11 presses the molten plastic material 14 in the die space 7, while the molten plastic material 14 in the die space solidifies, forming the strip 5 that consists of plastic material on the edge 4 of the starting sheet 2 of the electrode.

FIG. 6 shows a position after FIG. 5, wherein the die space 7 is opened by moving the die parts 9 and 10 apart from each other.

FIGS. 7-10 show the operation of a second embodiment of the equipment according to the invention.

Figure 7:
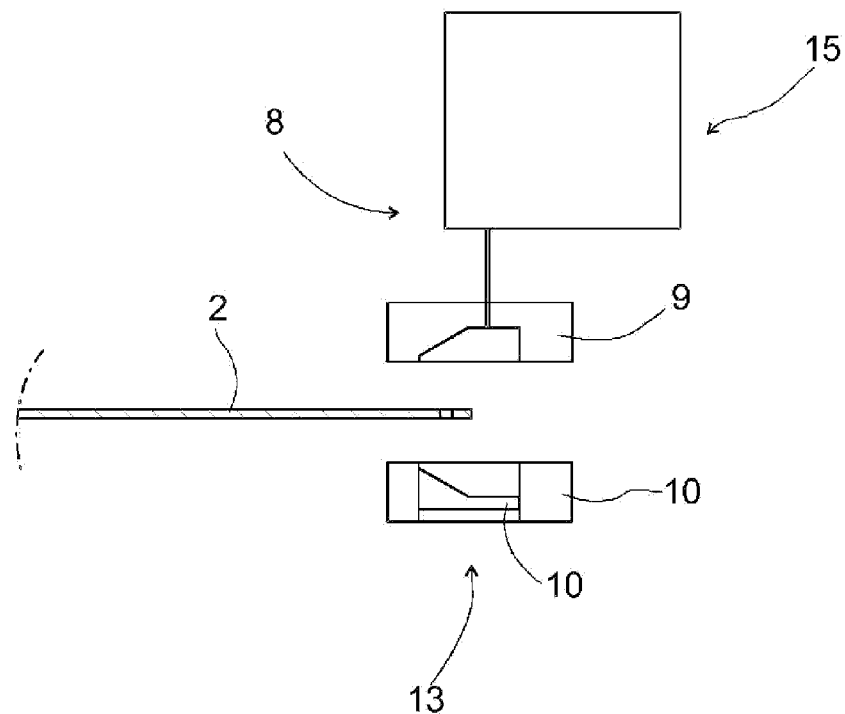
FIGS. 7-10 show the operating principle of a second embodiment of the equipment according to the invention.

In FIG. 7, the edge 4 of the starting sheet 2 of the electrode is placed between two fixed die parts 9 and two moving die parts 10.

Figure 8:
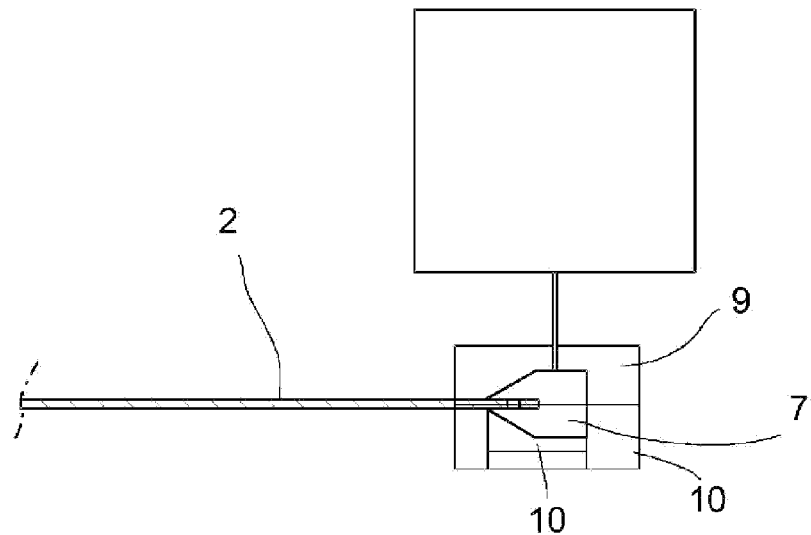

FIG. 8 shows a position after FIG. 7, wherein the fixed die part 9 and the moving die part 10 are arranged with respect to the edge 4 of the starting sheet 2 of the electrode, so that a die space 7 is formed, wherein the edge 4 of the starting sheet 2 of the electrode lies. In FIG. 4, the dielectric material 14; in this case, molten plastic material, is fed into the die space 7.

Figure 9:
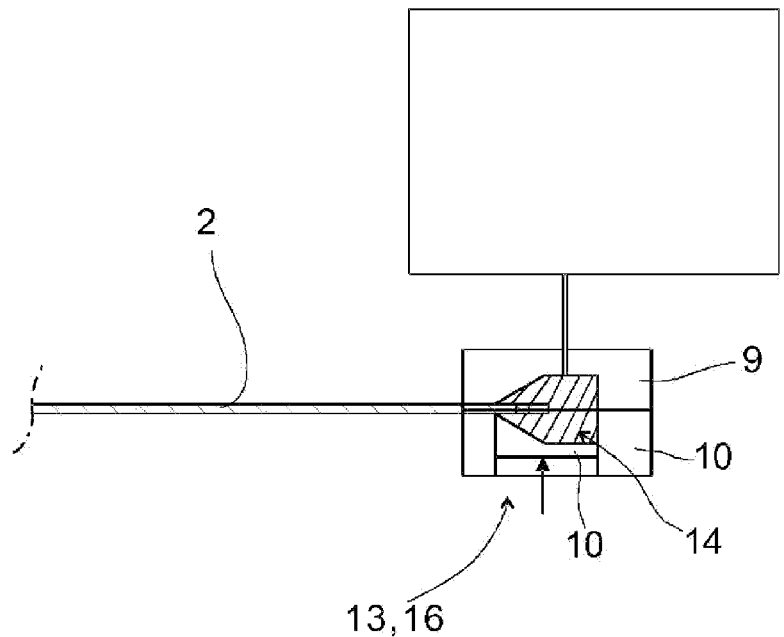

FIG. 9 shows a position after FIG. 4, wherein that changing member 13 of the volume of the die space 7, which is in the form of the moving die part 10 and which forms the pusher 11, presses the molten plastic material 14 in the die space 7, while the molten plastic material 14 solidifies in the die space and forms the strip 5, which consists of plastic material, on the edge 4 of the starting sheet 2 of the electrode.

Figure 10:
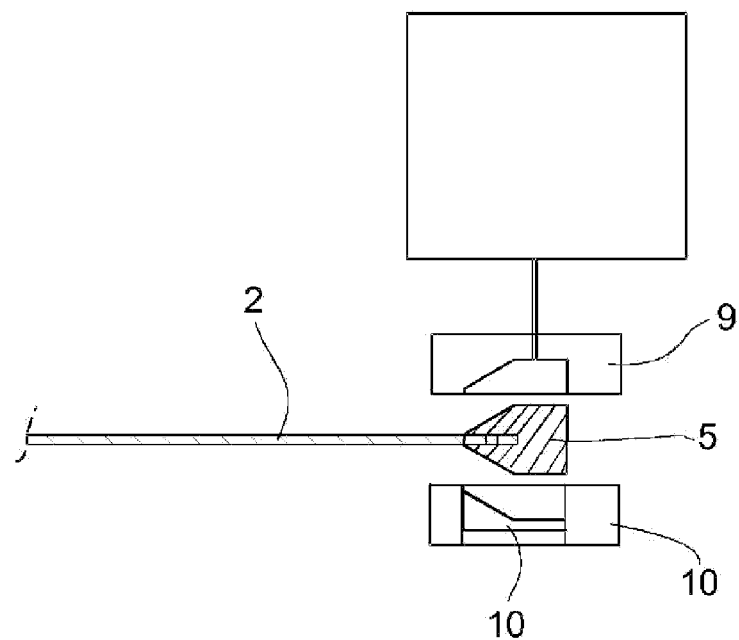

FIG. 10 shows a position after FIG. 5, wherein the die space 7 is opened by moving the moving die parts 10 apart from the fixed die part 9.

It is obvious to those skilled in the art that with technology improving, the basic idea can be implemented in various ways. Thus, the invention and its embodiments are not limited to the examples described above but they may vary within the scope of the claims.

The invention claimed is:

1. A method of providing an edge of a starting sheet of an electrode with a dielectric strip of dielectric material, comprising:
a positioning stage, wherein the edge of the starting sheet of the electrode is at least partly fitted in a die space;
a feeding stage, wherein the dielectric material is fed into the die space;
a melting stage, wherein the dielectric material is melted; and
a solidification stage, wherein the dielectric material is solidified in the die space forming the edge of the starting sheet of the electrode, which is at least partly fitted in the die space, with the dielectric strip;
wherein
the dielectric material in the die space forming the dielectric strip, is pressed to the edge of the starting sheet of the electrode which at least partly lies in the die space during the solidification stage,
and wherein the die space consists of several die parts, at least one of which is a movable die part, and
at least one movable die part is moved with respect to the die space, so that the volume of the die space is reduced during the solidification stage.

2. A method according to claim 1, wherein the dielectric material in the die space, is pressed to the edge of the starting sheet of the electrode, which lies at least partly in the die space, by changing the volume of the die space during the solidification stage.

3. A method according to claim 1, wherein the melting stage is carried out before the feeding stage, so that the dielectric material is fed into the die space in molten form.

4. A method according to claim 3, wherein the molten dielectric material is fed through an extruder into the die space.

5. A method according to claim 1, wherein the dielectric material is fed into the die space in solid form.

6. A method according to claim 1, wherein
the die space comprises several die parts; and,
at the positioning stage, the edge of the starting sheet of the electrode is at least partly fitted in the die space by arranging the die parts at least partly around the edge of the starting sheet of the electrode and the edge of the starting sheet of the electrode at least partly lies in the die space formed by the die parts.

7. A method according to claim 1, wherein at least one movable die part is used as pusher, which forms a changing member of the volume of the die space, and the pusher is moved at least partly into the die space so that the volume of the die space is reduced during the solidification stage.

8. A method according to claim 1, wherein, a pusher is moved into and inside the die space during the solidification stage.

9. A method according to claim 1, wherein the dielectric material is fed into the die space by a feeding device that moves with respect to the die space.

10. A method according to claim 1, wherein the edge of the starting sheet of the electrode comprises grip members.

11. A method according to claim 10, wherein the edge of the starting sheet of the electrode comprises grip members in the form of openings through the edge of the starting sheet of the electrode.

12. A method according to claim 1, wherein the edge of the starting sheet of the electrode is kept in place with respect to the die space during the feeding and pressing stages.

13. A method according to claim 1, wherein the edge of the starting sheet of the electrode is fully fitted in the die space.

14. Equipment for providing an edge of a starting sheet of an electrode with a dielectric strip of dielectric material, comprising:
melting equipment for melting the dielectric material;
a die space, in which the edge of the starting sheet of the electrode can at least partly be fitted and where the dielectric material melted by the melting equipment is adapted to solidify to form the dielectric strip; and
a feeding device configured to feed the dielectric material into the die space;
wherein
the equipment comprises pressing members for pressing the dielectric material in the die space to an edge of the starting sheet of the electrode, which is at least partly fitted in the die space, during solidification of the dielectric material melted by the melting equipment,
and the pressing members comprise members changing the volume of the die space and pressing the dielectric material in the die space to that edge of the starting sheet of the electrode, which is at least partly fitted in the die space, during the solidification of the dielectric material, and
wherein the die space comprises several die parts, at least one of which is movable with respect to the die space; and
wherein the die parts can at least partly be fitted around the edge of the starting sheet of the electrode, so that the edge of the starting sheet of the electrode is at least partly located in the die space formed by the die parts; and
wherein said at least one movable die part constitutes the changing member of the volume of the die space, so that the said at least one movable die part can be moved with respect to the die space, when the edge of the starting sheet of the electrode is at least partly located in the die space and the dielectric material has been fed into the die space, so that the volume of the die space decreases during the solidification of the dielectric material melted by the melting equipment.

15. Equipment according to claim 14, wherein the melting equipment is fitted in the feeding device of the dielectric material, so that the feeding device of the dielectric material is adapted to feed the dielectric material in molten form into the die space.

16. Equipment according to claim 15, wherein the feeding device of the dielectric material comprises an extruder configured to feed the dielectric material in molten form into the die space.

17. Equipment according to claim 14, wherein
the feeding device of the dielectric material is adapted to feed the dielectric material in solid form into the die space; and
the melting equipment is fitted in the die space so that the melting equipment is adapted to melt, in the die space, the dielectric material that has been fed into the die space in solid form.

18. Equipment according to claim 14, wherein
the die space comprises several die parts; and
the die parts can at least partly be fitted around the edge of the starting sheet of the electrode, so that the edge of the starting sheet of the electrode is at least partly located in the die space formed by the die parts.

19. Equipment according to claim 14, further comprising at least one movable die part configured to form a pusher, which forms a changing member of the volume of the die space and which pusher can be moved at least partly into the die space when the edge of the starting sheet of the electrode is located at least partly in the die space and dielectric plastic material has been fed into the die space so that the volume of the die space is reduced during the solidification of the dielectric material melted by the melting equipment.

20. Equipment according to claim 14, wherein the changing member of the volume of the die space is a pusher, which can at least partly be moved into the die space, when the edge of the starting sheet of the electrode is at least partly located in the die space and the dielectric material has been fed into the die space, so that the volume of the die space decreases during the solidification of the dielectric material melted by the melting equipment.

21. Equipment according to claim 14, wherein the feeding device of the dielectric material is adapted to move with respect to the die space.

* * * * *